June 28, 1932.   J. C. McCUNE   1,865,125
BRAKE REGULATOR
Filed June 10, 1930
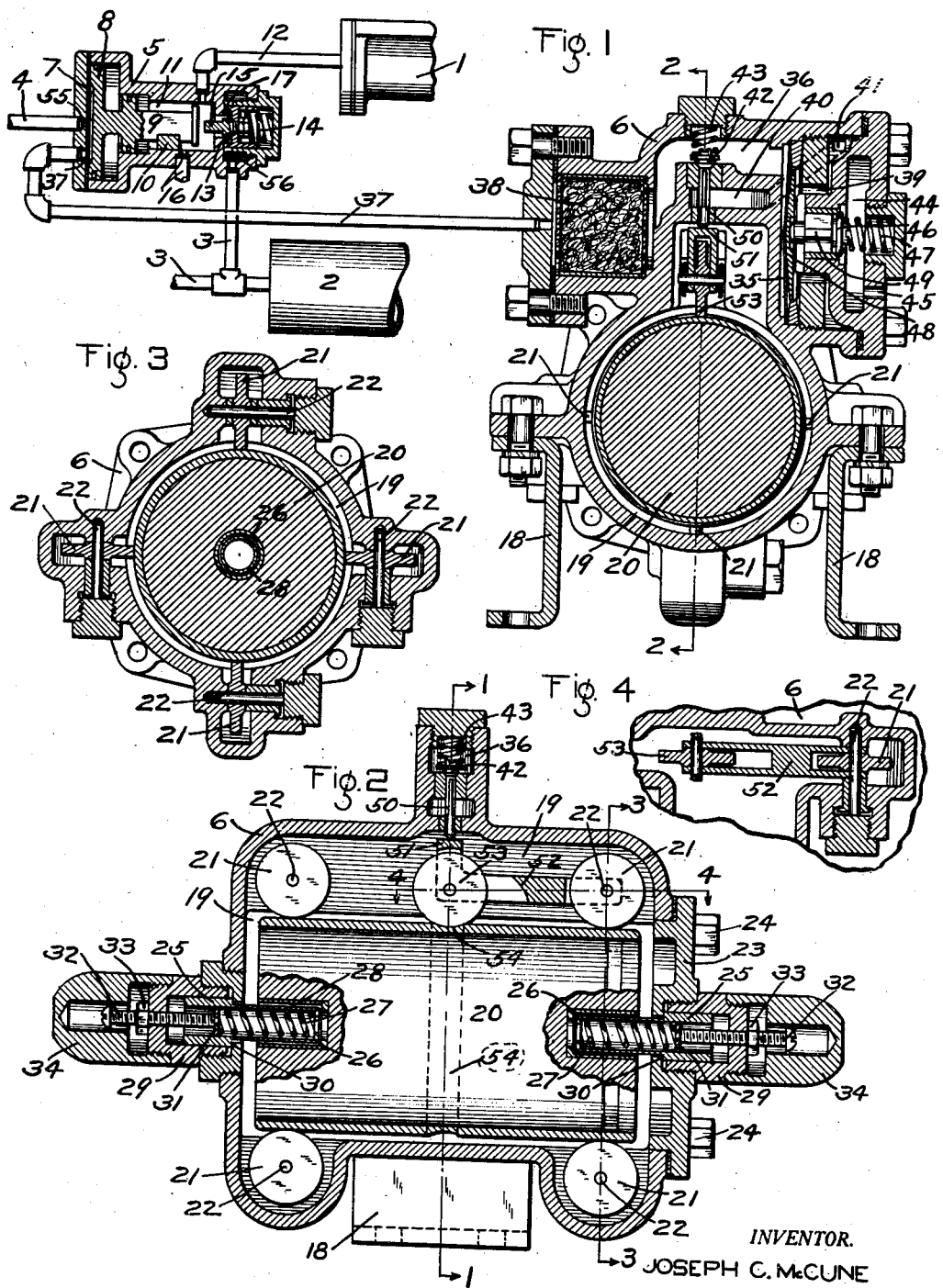
INVENTOR.
JOSEPH C. McCUNE
BY
Wm. N. Cady
ATTORNEY.

Patented June 28, 1932

1,865,125

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE REGULATOR

Application filed June 10, 1930. Serial No. 460,121.

This invention relates to fluid pressure brake apparatus for vehicles and more particularly to that type of apparatus embodying inertia controlled means for regulating the braking pressure according to the rate of retardation of the vehicle.

The principal object of my invention is to provide an improved fluid pressure brake apparatus of the above type.

In the accompanying drawing: Fig. 1 is a diagrammatic view, mainly in section, of a portion of a fluid pressure brake apparatus embodying my invention; Fig. 2 is a longitudinal sectional view of the inertia controlled governor taken on the line 2—2 of Fig. 1; Fig. 3 is a cross sectional view of the same taken on the line 3—3 of Fig. 2; and Fig. 4 is a fragmentary sectional view taken on the line 4—4 of Fig. 2. The line 1—1 of Fig. 2 indicates where the cross sectional view of the inertia controlled governor shown in Fig. 1 is taken.

As shown in the drawing, the fluid pressure brake apparatus may comprise a brake cylinder 1, a main reservoir 2, a main reservoir pipe 3, an application and release pipe 4, an application valve device 5 and an inertia controlled governor device 6.

The application valve device 5 may comprise a casing having a chamber 7 constantly connected to the pipe 4 through a restricted passage 55 and containing a piston 8 which is adapted, through the medium of a stem 9, to operate a slide valve 10 operatively connected to the stem and contained in a chamber 11 constantly connected to the brake cylinder 1 through a pipe 12. Also contained in the casing is a fluid pressure supply valve 13 which is subject to the pressure of a spring 14 and which is provided with a stem 15 adapted to be operatively engaged by the end of the piston stem 9.

In Fig. 1 of the drawing, the application valve device 5 is shown in its normal brake releasing position in which the application piston 8 and slide valve 10 are in their extreme left hand or brake releasing positions. With the slide valve 10 in this position, the valve chamber 11 and consequently the brake cylinder 1 are connected to the atmosphere through a pipe 16. With the piston 8 in release position, the stem 9 will be out of engagement with the end of the supply valve stem 15, so that the pressure of the spring 14 will maintain the supply valve 13 seated against its seat rib 17, thereby maintaining communication closed from a chamber 56, constantly connected to the main reservoir pipe 3, to the valve chamber 11.

The inertia controlled governor device 6 may comprise a casing which is secured to spaced supports 18 adapted to be rigidly attached to the usual framing of the vehicle. This casing has a chamber 19 containing an inertia weight 20 which is movable back and forth in the direction of its length on guide rollers 21 rotatably mounted on shafts 22 carried by the casing, said rollers being so disposed that they maintain the weight against movement in any direction at an angle to its longitudinal axis.

The casing of the governor device is provided with an opening sufficiently large to permit of the endwise insertion of the weight 20 into the chamber 19, which opening, when the weight 20 is in the chamber, is closed by a cap 23 removably secured to the casing by bolts 24 or any other desired means.

Between the casing of the governor device and each end of the weight 20, a mechanism 25 is provided, which mechanism tend to maintain the weight centralized in the direction of its length. Each of these mechanisms 25 may comprise a plunger 26 which is subject to the pressure of a spring 27 and which is adapted to be engaged by the weight within a central bore 28 in the weight. The outer end portion of each plunger 26 is slidably mounted in a cap nut 29 secured to the casing and is provided with a shoulder 30 adapted to engage the casing to limit the inward movement of the plunger. Within the plunger and in engagement with one end of the spring 27 is a movable plate 31 which is movable to adjust the pressure of the spring by an adjusting member 32 having a screw-threaded connection with the cap nut 29, which member is locked in any desired adjusted position by a check nut 33. The outer end of the member 32 projects beyond the cap nut 29 and is guarded against damage by a guard 34 having screw-threaded connection with the cap nut 29.

Mounted in the casing of the governor device is a flexible diaphragm 35, at one side of which, is a chamber 36 to which the application piston chamber 7 is constantly connected through a pipe and passage 37 and an air strainer device 38 mounted in the casing. At the other side of the diaphragm is a chamber 39 to which another chamber 40 in the casing is constantly connected through a passage 41.

Contained in the chamber 36 is an exhaust valve 42 which is subject to the pressure of a spring 43 and which is operative to open and close communication from the chamber 36 to the chamber 40 and consequently to the chamber 39.

Contained in a chamber 44, of the casing, which is connected to the atmosphere through a passage 45 is an exhaust control valve 46 which is subject to the pressure of a spring 47 also contained in the chamber 44, the operation of which, to control the opening and closing of communication from the chamber 39 and the chamber 44, is controlled by the flexible diaphragm 35 through the medium of a follower 48 in engagement with the diaphragm and a valve stem 49 in operative engagement with the follower.

The exhaust valve 42 is provided with a stem 50 which terminates within the inertia weight chamber 19 and is adapted to be operatively engaged by the end 51 of an arm 52 contained in the chamber 19. The other end of the arm is pivotally mounted on one of the adjacent roller shafts 22. The free end portion of the arm 52 is provided with a roller 53 which is adapted to engage the outer surface of the inertia weight 20 at all times. When the weight 20 is in its centralized position as shown in Fig. 2 of the drawing, the roller 53 engages the weight 20 within a depression or groove 54 which is preferably continuous around the weight, the roller being disposed crosswise of the groove. With the roller seated in the groove, the end 51 of the arm 52 is out of engagement with the end of the discharge valve stem 50 so that the pressure of the spring 43 will maintain the discharge valve seated. When the weight is moved in the direction of its length from its centralized position, the roller will be forced upwardly out of the notch 54 so that the end 51 of the arm will engage and force the exhaust valve stem 50 upwardly, unseating the exhaust valve 42.

It will here be noted that the weight 20 is free to rotate about its longitudinal axis so that the rollers will not constantly engage the same portions of the outer surface of the weight, but will engage different portions, thereby preventing the rollers from wearing grooves in the weight.

Assuming now that a vehicle equipped with the apparatus just described to be in motion and the apparatus in running and release position as shown in the drawing, the application and release pipe is connected to the atmosphere through the usual brake valve device so that the piston 8 and slide valve 10 of the application valve device 5 will be in their extreme left hand positions. With the slide valve 10 in this position, the atmospheric port and pipe 16 is uncovered, so that the brake cylinder 1 is connected to the atmosphere by way of pipe 12, valve chamber 11 and port and pipe 16. Further, with the application piston in release position, the end of the piston stem 9 will be out of engagement with the end of stem 15, so that the pressure of the spring 14 maintains the supply valve 13 seated against its seat rib 17, thereby closing off communication from the main reservoir pipe 3 to the application valve chamber 11.

To effect an application of the brakes, the operator by the use of the brake valve device, causes fluid under pressure to be supplied from the main reservoir pipe 3 to the application and release pipe 4 in the usual manner. Fuid under pressure thus supplied to the pipe 4 flows through the restricted passage 55 to the application piston chamber 7, causing the application piston 8 to move toward the right hand, carrying the slide valve 10 with it. As the piston is thus operated, the slide valve laps the release port 16, closing communication from the application slide valve chamber 11 to the atmosphere. After the port 16 is lapped, the end of the piston stem 9 engages the stem 15 of the supply valve 13 and causes said valve to be unseated from its seat rib 17 against the pressure of the spring 14. With the supply valve unseated, fluid under pressure is supplied from the main reservoir 2 through the main reservoir pipe 3, chamber 56, past the unseated valve 13, through the valve chamber 11 and pipe 12.

Fluid under pressure supplied to the application piston chamber 7 flows therefrom to the chamber 36 in the inertia governor device 6 through passage and pipe 37 and the air strainer device 38, and the pressure of fluid thus supplied causes the diaphragm 35 to flex toward the right hand, causing the exhaust control valve 46 to unseat against the pressure of the spring 47, thus establishing communication from the chamber 39 and consequently the chamber 40 to the atmosphere through chamber 44 and passage 45. With the inertia weight in its central position as shown in Fig. 2, the exhaust valve 42 is maintained seated, so that the pressure of fluid in the application piston chamber 7 is not permitted to reduce.

Whatever the pressure in the brake cylinder or the application chamber 7 may be, no further operation of the apparatus takes place unless or until the friction of the brake shoes, resulting from the brake cylinder pressure, shall cause the rate of retardation for which the inertia governor device is adjusted. When the predetermined fixed rate of retardation is reached, the resistance of the inertia of the weight 20 to such retardation overcomes the tendency of the weight to remain stationary relative to the casing and moves forwardly against the pressure of the spring-pressed plunger 26 of one of the mechanisms 25. Since the shoulder 30 of the spring-pressed plunger 26 of the other mechanism 25 is in engagement with the casing, this mechanism will have no effect upon the movement of the weight in this direction.

As the weight thus shifts its position, the roller 53 rides out of the groove 54 and in so doing raises the end of the arm 51 and exhaust valve stem 50, unseating the exhaust valve 42. Upon the unseating of the valve 42, fluid under pressure is discharged from the application piston chamber 7 to the atmosphere through passage and pipe 37, air strainer device 38 in the inertia governor device, chamber 37, past the unseated exhaust valve 42 and the fluted portion of its stem 50, through chamber 40, passage 41, diaphragm chamber 39, past the unseated exhaust control valve 46, chamber 44 and passage 45. It will here be understood that the discharge of fluid under pressure from the application piston chamber 7 will be at a faster rate than it is supplied thereto through the restricted passage 55 so that the pressure of fluid in this chamber is reduced.

When the pressure of fluid in this chamber 7 is thus reduced, the pressure of fluid in the application slide valve chamber 11 causes the piston 8 and slide valve 10 to move to their extreme left hand or release positions, thus closing off the further supply of fluid under pressure from the main reservoir 3 to the valve chamber 11 and venting fluid under pressure from the brake cylinder 1 to the atmosphere.

The discharge of fluid under pressure from the brake cylinder 1 continues until the friction of the brake shoes, in consequence, is correspondingly reduced, and the rate of retardation sufficiently declines to permit the mechanism 25, which has been brought into action, to return the weight 20 to its normal central position.

As the weight 20 reaches its central position, the roller 53 rides into the groove 54, lowering the end 51 of the arm 52 out of supporting engagement with the discharge valve stem 50 and permitting the pressure of the spring 43 to seat the exhaust valve 42. With the valve 42 seated, the atmospheric communication from the application piston chamber 7 is closed off, so that the pressure of fluid being supplied through the pipe 4 and restricted passage 55 will build up and cause the application valve device to again operate to application position. Now should the rate of retardation again equal the predetermined limit, the apparatus will again operate as described to reduce the rate of retardation.

It will here be understood that the inertia weight 20 is so mounted and adjusted as to remain in its normal central position as shown in Fig. 2 of the drawing and will have no effect upon the brake system unless the rate of retardation resulting upon an application of the brakes becomes excessive so that there is danger of wheel sliding or of producing shocks and jerks.

The exhaust control valve spring 47 is of such a value that if, after an application of the brakes has been effected, the discharge valve 42 of the inertia governor device should fail to seat, due to the valve sticking or due to the inertia weight 20 failing to return to its central position for any reason, it will seat the valve 46 when the application piston chamber pressure present in chamber 36 is reduced to a predetermined low degree, say for instance to 10 to 12 pounds, and consequently prevent the entire loss of brake cylinder pressure.

If the exhaust valve 42 should, for any reason, be open when the apparatus is in running and release position, and an application of the brakes be effected, fluid under pressure from the application piston chamber 7 will be supplied to both of the chambers 36 and 39. Since the pressures of fluid in these chambers will be substantially equal, the diaphragm 35 will not be caused to operate and the pressure of the spring maintains the exhaust control valve 46 seated, thus rendering the inertia governor device ineffective to control the brake cylinder pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, of a valve device operative to supply fluid under pressure to said brake cylinder to effect an application of the brakes, a valve operative to control the operation of said valve device to release fluid under pressure from the brake cylinder, and an inertia controlled mechanism operative upon a certain rate of retardation to control the operation of said valve.

2. In a fluid pressure brake, the combination with a brake cylinder, of a valve device operative to supply fluid under pressure to said brake cylinder to effect an application of the brakes, a valve operative to control the operation of said valve device to release fluid under pressure from the brake cylinder, and an inertia controlled weight movable in a straight line in the direction of its length upon a certain rate of retardation to control the operation of said valve.

3. In a fluid pressure brake, the combination with a brake cylinder, of a valve device operative to supply fluid under pressure to said brake cylinder to effect an application of the brakes, a valve operative to control the operation of said valve device to release fluid under pressure from the brake cylinder, an inertia controlled weight operative upon a certain rate of retardation to control the operation of said valve, and anti-friction guides for said weight.

4. In a fluid pressure brake, the combination with a brake cylinder, of a valve device operative to supply fluid under pressure to said brake cylinder to effect an application of the brakes, a valve operative to control the operation of said valve device to release fluid under pressure from the brake cylinder, an inertia controlled weight operative upon a certain rate of retardation to control the operation of said valve, and pressure means operative to return said weight to its normal position upon a decrease in the rate of retardation.

5. In a fluid pressure brake, the combination with a brake cylinder, of a valve device operative to supply fluid under pressure to said brake cylinder to effect an application of the brakes, a valve operative to control the operation of said valve device to release fluid under pressure from the brake cylinder, an inertia controlled weight operative upon a certain rate of retardation to control the operation of said valve, and a spring mechanism for returning said weight to its normal position when the retardation rate has been decreased.

6. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, and means controlled according to variations in the rate of retardation for controlling the operation of said valve.

7. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, means controlled according to variations in the rate of retardation for controlling the operation of said valve, and valve means operative to prevent the entire exhaust of fluid from said valve device when said valve is unseated.

8. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, a pivoted arm for controlling the operation of said valve, and means operative according to variations in the rate of retardation for controlling the operation of said arm.

9. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, a pivoted arm for controlling the operation of said valve, and an inertia weight operative upon a certain rate of retardation for operating said arm to unseat said valve and operative upon a reduction in said rate for controlling the operation of said arm to permit said valve to seat.

10. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, a pivoted arm for controlling the operation of said valve, an inertia controlled weight operative upon a certain rate of retardation for operating said arm to unseat said valve, and means for operating said weight for controlling the operation of said arm to permit said valve to seat when the rate of retardation has been decreased.

11. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, a pivoted arm for controlling the operation of said valve, an inertia controlled weight operative upon a certain rate of retardation for operating said arm to unseat said valve, means for operating said weight for controlling the operation of said arm to permit said valve to seat, and means for controlling the operation of said valve device to prevent the entire release of fluid under pressure from the brake cylinder in the event of said valve being maintained unseated.

12. In a fluid pressure brake, the combination with a brake cylinder, of a valve device operative to supply fluid under pressure to the brake cylinder to effect an application of the brakes and operative to release fluid under pressure from the brake cylinder to effect a release of the brakes, of a normally seated valve operative to a position to exhaust fluid under pressure from said valve device to effect the operation of said device to release fluid under pressure from the brake cylinder, a pivoted arm for controlling the operation of said valve, an inertia controlled weight operative upon a certain rate of retardation for operating said arm to unseat said valve, means for operating said weight for controlling the operation of said arm to permit said valve to seat, and pressure sensitive means operative to close off the exhaust of fluid from said valve device when the pressure of fluid in the valve device has been reduced a predetermined amount.

13. In a fluid pressure brake, the combination with means operative to control the application and the release of the brakes, of an inertia controlled device for governing the operation of said means when an application of the brakes has been initiated, said device comprising a normally seated exhaust valve operative to a position to exhaust fluid under pressure to effect the operation of said means to partially release the brakes, an inertia controlled weight operated to unseat said valve upon a predetermined rate of retardation, and means for operating said weight to permit said valve to seat when the predetermined rate of retardation has been decreased.

14. In a fluid pressure brake, the combination with means for effecting an application of the brakes, of an inertia device operated according to the rate of retardation for controlling the force with which the brakes are applied, said device comprising an exhaust valve for controlling the force with which the brakes are applied, and an inertia controlled weight operative in a straight line to control the operation of said valve.

15. In a fluid pressure brake, the combination with a brake cylinder and an application valve device operative upon supplying fluid under pressure thereto to supply fluid under pressure to the brake cylinder and operative upon a reduction in fluid pressure for releasing fluid under pressure from the brake cylinder, of an inertia controlled device operated according to the rate of retardation for effecting and controlling a reduction in the pressure of fluid in said valve device.

16. In a fluid pressure brake, the combination with a brake cylinder and an application valve device operative upon supplying fluid under pressure thereto to supply fluid under pressure to the brake cylinder and operative upon a reduction in fluid pressure for releasing fluid under pressure from the brake cylinder, of an inertia controlled device for releasing fluid under pressure from said valve device, said inertia device comprising an exhaust valve normally closing communication through which fluid under pressure is released from said valve device and operative to establish communication through which fluid is released from said valve device, and a weight operative according to the rate of retardation for controlling the operation of said exhaust valve.

17. In a fluid pressure brake, the combination with a brake cylinder and an application valve device operative upon supplying fluid under pressure thereto to supply fluid under pressure to the brake cylinder and operative upon a reduction in fluid pressure for releasing fluid under pressure from the brake cylinder, of an inertia controlled device for releasing fluid under pressure from said valve device, said inertia device comprising an exhaust valve normally closing communication through which fluid under pressure is released from said valve device and operative to establish communication through which fluid is released from said valve device, a weight operative upon a certain rate of retardation for opening said valve, and spring means for operating said weight to permit said valve to be closed when the rate of retardation is decreased.

18. An inertia controlled governor device comprising a casing, an exhaust valve in said casing, and an inertia weight in said casing movable in a straight line to control the opening and closing of said valve.

19. An inertia controlled governor device comprising a casing, an exhaust valve in said casing, and an inertia weight in said casing operative to control the opening and closing of said valve, and rollers mounted in said casing and guiding said weight.

20. An inertia controlled governor device comprising a casing, an exhaust valve in said casing, an arm pivotally connected to said casing for controlling the operation of said valve, a roller on said arm, and an inertia weight in said casing cooperating with said roller to control the operation of said arm.

In testimony whereof I have hereunto set my hand, this 6th day of June, 1930.

JOSEPH C. McCUNE.